US007653002B2

(12) United States Patent
Hardy et al.

(10) Patent No.: US 7,653,002 B2
(45) Date of Patent: *Jan. 26, 2010

(54) REAL TIME MONITORING OF PERCEIVED QUALITY OF PACKET VOICE TRANSMISSION

(75) Inventors: William Christopher Hardy, Arlington, VA (US); Frank A. McKiel, Jr., Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1726 days.

This patent is subject to a terminal disclaimer.

(21) Appl. No.: 10/826,114

(22) Filed: Apr. 16, 2004

(65) Prior Publication Data
US 2005/0141493 A1  Jun. 30, 2005

Related U.S. Application Data

(63) Continuation-in-part of application No. 09/778,186, filed on Feb. 7, 2001, now Pat. No. 7,085,230.

(60) Provisional application No. 60/492,597, filed on Aug. 5, 2003.

(51) Int. Cl.
*H04L 12/26* (2006.01)

(52) U.S. Cl. ............... 370/252; 370/352; 370/356; 370/400; 370/237

(58) Field of Classification Search .............. 370/252, 370/253, 352–356; 704/200.61, 233, 231; 395/200.61
See application file for complete search history.

(56) References Cited

U.S. PATENT DOCUMENTS

| 4,015,480 A | 4/1977 | Giers |
| 4,438,511 A | 3/1984 | Baran |
| 5,119,367 A | 6/1992 | Kawakatsu et al. |
| 5,200,950 A | 4/1993 | Foglar |
| 5,282,203 A | 1/1994 | Oouchi |
| 5,428,613 A | 6/1995 | Spiotta et al. |
| 5,479,576 A | 12/1995 | Watanabe et al. |
| 5,539,310 A | 7/1996 | Basser et al. |
| 5,553,059 A | 9/1996 | Emerson et al. |

(Continued)

FOREIGN PATENT DOCUMENTS

WO           98/59509           12/1998

(Continued)

OTHER PUBLICATIONS

ITU-T Series G: Transmission System and Media, Digital Systems and Networks, Recommendation G.107, May 2000.

(Continued)

*Primary Examiner*—Curtis Kuntz
*Assistant Examiner*—Phung-Hoang J Nguyen

(57) ABSTRACT

The present invention is directed to a system and method for monitoring perceived quality of a packet-switched voice service in a network. The method includes the step of receiving a packetized voice communication via the packet-switched voice service. At least one objective measurement is obtained from the received packetized voice communication. User perceived quality of voice data is derived from the at least one objective measurement. The user perceived quality of voice data is provided to a user. The steps of receiving, obtaining, deriving, and providing are performed in real-time.

48 Claims, 5 Drawing Sheets

U.S. PATENT DOCUMENTS

| | | | |
|---|---|---|---|
| 5,572,570 A | 11/1996 | Kuenzig | |
| 5,715,372 A | 2/1998 | Meyers et al. | |
| 5,742,929 A | 4/1998 | Kallman et al. | |
| 5,768,527 A * | 6/1998 | Zhu et al. | 709/231 |
| 5,825,849 A | 10/1998 | Garland et al. | |
| 5,835,565 A | 11/1998 | Smith et al. | |
| 5,867,813 A | 2/1999 | Di Pietro et al. | |
| 5,887,027 A | 3/1999 | Cohen et al. | |
| 5,898,668 A | 4/1999 | Shaffer | |
| 5,903,558 A * | 5/1999 | Jones et al. | 370/351 |
| 5,933,475 A | 8/1999 | Coleman | |
| 5,940,471 A | 8/1999 | Homayoun et al. | |
| 5,940,479 A | 8/1999 | Guy et al. | |
| 5,978,783 A | 11/1999 | Meyers et al. | |
| 6,041,048 A | 3/2000 | Erickson et al. | |
| 6,041,294 A | 3/2000 | Beerends | |
| 6,046,979 A | 4/2000 | Bauman | |
| 6,064,653 A | 5/2000 | Farris | |
| 6,067,350 A | 5/2000 | Gordon | |
| 6,094,464 A | 7/2000 | Ebringer et al. | |
| 6,111,949 A | 8/2000 | Sheets et al. | |
| 6,128,291 A | 10/2000 | Perlman et al. | |
| 6,147,988 A | 11/2000 | Bartholomew et al. | |
| 6,169,896 B1 | 1/2001 | Sant et al. | |
| 6,172,970 B1 | 1/2001 | Ling et al. | |
| 6,192,109 B1 | 2/2001 | Amrany et al. | |
| 6,243,373 B1 | 6/2001 | Turock | |
| 6,246,978 B1 | 6/2001 | Hardy | |
| 6,256,304 B1 | 7/2001 | Vayrynen | |
| 6,256,608 B1 | 7/2001 | Malvar | |
| 6,275,797 B1 * | 8/2001 | Randic | 704/233 |
| 6,282,192 B1 | 8/2001 | Murphy et al. | |
| 6,285,653 B1 | 9/2001 | Koeman et al. | |
| 6,304,634 B1 | 10/2001 | Hollier et al. | |
| 6,335,927 B1 * | 1/2002 | Elliott et al. | 370/352 |
| 6,353,609 B1 | 3/2002 | Ethridge et al. | |
| 6,356,601 B1 | 3/2002 | Chen et al. | |
| 6,363,065 B1 | 3/2002 | Thornton et al. | |
| 6,370,120 B1 * | 4/2002 | Hardy | 370/252 |
| 6,377,636 B1 | 4/2002 | Paulraj et al. | |
| 6,389,005 B1 | 5/2002 | Cruickshank | |
| 6,434,606 B1 | 8/2002 | Borella et al. | |
| 6,452,922 B1 | 9/2002 | Ho | |
| 6,463,053 B1 | 10/2002 | Chen | |
| 6,477,492 B1 | 11/2002 | Connor | |
| 6,512,746 B1 | 1/2003 | Sand | |
| 6,574,216 B1 * | 6/2003 | Farris et al. | 370/352 |
| 6,577,996 B1 | 6/2003 | Jagadeesan | |
| 6,618,385 B1 | 9/2003 | Cousins | |
| 6,633,545 B1 | 10/2003 | Milbrandt | |
| 6,665,271 B1 | 12/2003 | Thomas et al. | |
| 6,741,569 B1 * | 5/2004 | Clark | 370/252 |
| 6,775,240 B1 | 8/2004 | Zhang et al. | |
| 6,781,983 B1 | 8/2004 | Armistead | |
| 6,914,900 B1 | 7/2005 | Komatsu et al. | |
| 7,027,434 B2 * | 4/2006 | De Vleesschauwer et al. | 370/352 |
| 7,075,981 B1 | 7/2006 | Clark | |
| 7,085,230 B2 * | 8/2006 | Hardy | 370/232 |
| 7,099,282 B1 * | 8/2006 | Hardy | 370/252 |
| 7,167,451 B1 | 1/2007 | Oran | |
| 7,245,609 B2 | 7/2007 | D'Eletto | |
| 2002/0087370 A1 | 7/2002 | Brueckheimer et al. | |
| 2002/0114296 A1 | 8/2002 | Hardy | |

FOREIGN PATENT DOCUMENTS

| | | |
|---|---|---|
| WO | 00/33511 | 6/2000 |

OTHER PUBLICATIONS

Rix A W et al: "PESQ—the new ITU standard for end-to-end speech quality assessment" Audio Engineering Society Convention Paper, New York, NY, US, Sep. 22, 2000, pp. 1-18, XP002262437.

Peng et al., "Bark Scale Equalizer Design Using Warped Filter", IEEE, 2001, pp. 3317-3320.

Smith III et al., "Dark and ERB Bilinear Transforms", IEEE, 1999, pp. 697-708.

Baker, et al., "PPP Bridging Control Protocol (BCP)", Internet Engineering Task Force, Request for Comment 1638, Jun. 1994.

Chan et al., "Differentiated Services Quality of Service Policy Information Base", Internet Engineering Task Force, Request for Comment 3317, Mar. 2003.

Schulzrinne, et al., "RTP: A Transport Protocol for Real-Time Applications", Internet Engineering Task Force, Request for Comments: 1889, Jan. 1996.

ITU-T Study Group 12, "Objective Quality Measurement of Telephone-Band (300-3400H$_z$) Speech Codecs", ITU-T Recommendation P.861, Feb. 27, 1998, pp. 1-33[12].

ITU-T Study Group 12, "Perceptual Evaluation of Speech Quality (PESQ): An Objective Assessment of Narrow-Band Telephone Networks and Speech Codecs", ITU-T Recommendation P.862. Feb 23, 2001[12].

Anonymous, "Real=Time Quality Measurement for Telecommunication Call—By Alerting Subscriber of Call Selected to be in Sample Before Going to Operator". WPI World Patent Information Derwent, Derwent, GB, vol. 46, No. 92, Oct. 25, 1992[12].

ITU-T, Method for Subjective Determination of Transmission Quality, Recommendation P.800, Aug. 1996.

ITU-T, Method for Evaluation of Service From Standpoint of Speech Transmission Quality, Recommendation P.82, 1989.

ITU-T Subjective Performance Assessment of Telephone-Band And Wideband Digital Codecs, Recommendation P.830, Feb. 1996.

ITU-T, Subjective Listening Test Method for Evaluation Digital Circuit Multiplication and Packetized Voice Systems, Recommendation P.84, Mar. 1993.

ITU-T, Method for Subjective Performance Assessment of Quality of Speech Voice Output Devices, Recommendation P.85, Jun. 1994.

ITU-T, Methods for objective and subjective assessment of quality, Recommendation P. 861, Feb. 1998.

* cited by examiner

| Round-Trip Frame Latency (ms) | Dropped Frame Rate (average number of frames dropped/sec) | | | | | | | |
|---|---|---|---|---|---|---|---|---|
| | 0 | <1 | <1.5 | <2 | <3 | <4 | <5 | <6 | >=7 |
| 0 - 255 | | | | | | | | | |
| 256 - 280 | | | | | | | | | |
| 281 - 307 | | | (5) | | | | | | |
| 308 - 317 | | | | | | | | | |
| 318 - 341 | | | | | | | | | |
| 342 - 355 | | | | | | | | | |
| More than 355 | | | | | | | | | |

FIGURE 5

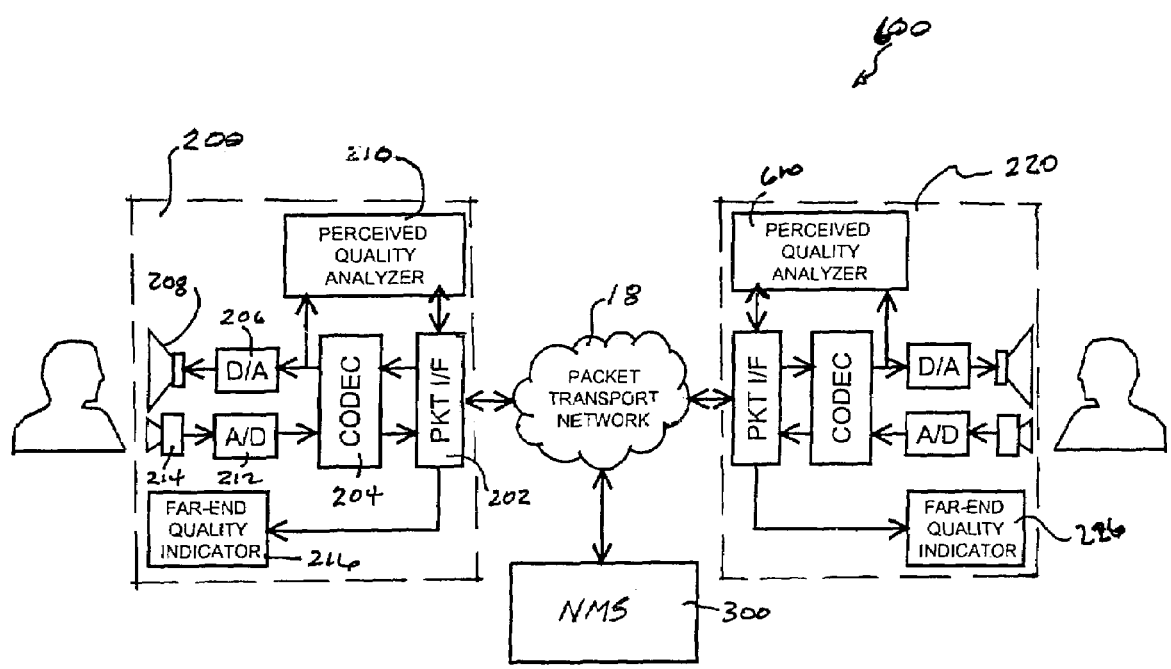
FIGURE: 6

REAL TIME MONITORING OF PERCEIVED QUALITY OF PACKET VOICE TRANSMISSION

CROSS-REFERENCE TO RELATED APPLICATIONS

This is a continuation-in-part of U.S. patent application Ser. No. 09/778,186 filed on Feb. 7, 2001, which is a continuation-in-part of U.S. Pat. No. 6,370,120 the content of which is relied upon and incorporated herein by reference in its entirety, and the benefit of priority under 35 U.S.C. §120 is hereby claimed. The present application also relates to provisional U.S. Patent Application No. 60/492,597, filed Aug. 5, 2003, which is incorporated by reference herein in its entirety and to which the benefit of priority under 35 U.S.C. §119(e) is hereby claimed.

BACKGROUND OF THE INVENTION

1. Field of the Invention

The present invention relates generally to telecommunications networks, and particularly to monitoring the quality of packet voice transmissions in real-time.

2. Technical Background

New telecommunications technologies are emerging that employ packet switching instead of the traditional circuit switched technologies provided by the public switched telephone networks (PSTN). These packet switched technologies are being used to support the transmission of digitized voice signals over a data network such as the Internet. Providing telephone-like full duplex voice over an Internet Protocol network (VoIP) is particularly important. VoIP services are attractive to commercial long-distance carriers because they enable the use of global Internet transport facilities to carry traffic that is presently being carried over dedicated circuit switched facilities. The potential benefits of VoIP are enormous in terms of better utilization of network bandwidth to support telephone traffic and the economies of scale from the use of one kind of transport for all telecommunications services. However, a major impediment to the immediate adoption of VoIP services relates to the user perception of the quality of voice communications using VoIP.

Traditional telephone connections have been subject to impairments in the form of noise, attenuation, distortion, cross-talk and echo. Such impairments are particularly common in analog portions of the network, such as subscriber loops and frequency domain multiplexing equipment. Digital transmission alleviates many of these problems but also introduces quantization noise and distortions due to bit errors in the digital signal. Even with perfect digital transmission applied to long haul transmissions, a typical telephone connection still includes many analog components where impairments can occur.

A poor connection or malfunctioning piece of equipment can produce conditions that a telephone customer will find objectionable or intolerable. When there is a high incidence of poor connections, customers may complain to the service provider or to a regulatory authority, or simply change long distance carriers. Thus, the perceived quality of a service provider's service is a major factor affecting the reputation and marketability of long distance telephone services.

To guard against poor quality, service providers have developed methods to obtain objective quality measurements upon a line, piece of equipment, or an end-to-end telephone connection. These measurements can help the service provider detect and gauge impairments, pinpoint weak elements, and correct deficiencies that degrade user perception of quality. The effects of extreme fault conditions on user perception of quality is clear. There are easily discernable thresholds for "no effect" and "substantial degradation" conditions. As a result, the average consumer has to come to expect a certain quality of service from the PSTN.

With the proliferation of voice-over-packet technologies, maintaining a quality of service comparable to the PSTN is a major concern of service providers, equipment vendors, and ultimately the consumers of packetized telecommunications services. Unlike circuit switched traffic, real time voice transmission using packet switched technologies is sensitive to packet loss, packet delay, and packet jitter occurrences which are characteristic of packet switched networks. Packet loss and packet delay variations may impact the ability of a voice codec to faithfully reproduce a digitally encoded voice signal. When a received packetized voice transmission is missing some packets, a codec may provide an audio signal that is distorted, garbled, or otherwise degraded.

In one approach that has been considered, the IntServ and Diffserv protocols have been proposed for improving the reliability and consistency of packet transport. (For reference, the IntServ and Diffserv approaches are described in documents, RFC 1638 and 3317 respectively, promulgated by the Internet Engineering Task Force (IETF).)

The Real Time Control Protocol (RTCP) has also been considered for obtaining real-time measurements of the receipt of packet data, and for reporting the measurements to a sender or to a network quality monitoring location. (For reference, RTCP is described in IETF document RFC 1889 and in ITU Recommendation H.225.0.)

One drawback to these various approaches is that, while the reporting of packet arrival statistics provides some estimate of data transmission quality, there is no consideration of the extent to which packet loss, packet delay, and packet jitter affect the perceived quality of a reconstructed voice signal.

Another drawback relates to the fact that the manner in which data transmission quality affects perceived quality of a voice channel is often dependent on the coding scheme employed by the codec. Various codec schemes may exhibit differing susceptibilities to packet-transmission variations and the dependency may be quite non-linear for some codec schemes. For example, a given packet loss rate or jitter may have very little effect on a G.711 encoded speech signal, whereas an identical packet loss rate or jitter may seriously degrade a more sophisticated G.723 encoded signal. Even if the particular codec scheme is known, an accurate model of codec behavior is required to map the observed packet characteristics to a perceived quality level. The introduction of a new standard encoding scheme, or a proprietary encoding scheme or encryption scheme, would necessitate the development and deployment of new models.

For these reasons, the mere reporting of packet loss statistics is inadequate. Without accurate information about the perceived quality level being experienced by users, a service provider is not certain when corrective action is necessary or what corrective action needs to be taken to improve packet transmission performance. A service provider may shift traffic or resources unnecessarily to improve quality of service (QOS) when, in fact, the perceived level of degradation is negligible to the users of the service. Likewise, a seemingly minor packet delivery problem might be causing big problems in user perception due to the particular codec scheme being used.

What is needed is a means for automatically monitoring and reporting in near real-time the quality of a packet voice transmission as perceived by a user receiving voice communications.

SUMMARY

The present invention provides a system and method for automatically monitoring and reporting, in real-time, the perceived quality of a packet voice transmission. The present invention is versatile in that it may be configured to report a simple raw distortion measurement or provide sophisticated estimates of perceived voice quality, using MOS and P[UDI]. In the latter case, the present invention provides an analytical mechanism for detecting when packet-switched voice services are likely to be perceived by users to be noticeably inferior to familiar PSTN services. This embodiment of the present invention may be based on the VQES model described below. The present invention also provides a network performance data collection and analysis system for packet switched networks. Further, the system of the present invention functions to monitor voice quality of VoIP services to support timely detection and notification of indications of deterioration.

One aspect of the present invention includes a method for monitoring perceived quality of a packet-switched voice service in a network. The method includes the step of receiving a packetized voice communication via the packet-switched voice service. At least one objective measurement is obtained from the received packetized voice communication. An estimate of user perceived quality of voice data is derived from the at least one objective measurement. The user perceived quality of the received digital voice data is provided to a far end user or a service provider. The steps of receiving, obtaining, deriving, and providing are performed in real-time. As taught herein, the objective measurement may be obtained from a digital signal output from a receiving codec such that the impact of transmission impairments upon the codec scheme are inherently taken into account in the measurement.

In another aspect, the present invention includes a system for monitoring the quality of a packet-switched voice service. The system includes a memory element configured to store a reference matrix that mathematically models likely user perception of acceptable quality of voice service. The reference matrix is empirically derived from a plurality of objective voice measurements. A measurement probe is configured to obtain a plurality of test measurements for each call placed over the packet-switched voice service. A computer is coupled to the memory element and the measurement probe. The computer is programmed to derive a test matrix from the plurality of test measurements. The computer processes the test matrix, in near real time, to determine the quality of voice over the packet-switched voice service. The quality of service is determined by comparing the reference matrix to the test matrix.

In another aspect, the present invention includes a method for monitoring the quality of a packet-switched voice service in a computer system having a graphical user interface, the graphical user interface including a display and a selection device. The method includes receiving an alarm signal from the computer system. The alarm signal is generated in response to determining that the quality of voice over the packet-switched voice service is below a predetermined level. A message is displayed in response to the alarm signal. An amplifying display icon is selected with the selection device. A human readable description of the alarm signal is displayed in response to the step of selecting. At least one indicator of likely user perception of the quality of voice carried over the packet-switched voice service is displayed.

In yet another aspect, the present invention includes a system for monitoring the quality of a packet-switched voice service in a network. The system includes a measurement device configured to obtain at least one objective measurement from a packetized voice communication in real-time. A processor is coupled to the measurement device. The processor is configured to derive user perceived quality of voice data from the at least one objective measurement and provide the user perceived quality of voice data in real-time.

In yet another aspect, the present invention includes a method for monitoring the quality of a packet-switched voice service. The method includes providing a reference matrix that mathematically models likely user perception of acceptable quality of voice service. The reference matrix is empirically derived from a plurality of objective voice measurements. A plurality of test measurements are obtained for each call placed over the packet-switched voice service. A test matrix is created from the plurality of test measurements. The test matrix is processed, in near real time, to determine the quality of voice over the packet-switched voice service. The quality of service is determined by comparing the reference matrix to the test matrix.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 5 is a diagram illustrating the semantic content of a test matrix, a reference matrix and a reference pattern matrix in accordance with an embodiment of the present invention; and FIG. 6 is a block diagram of a system for evaluating the perceived quality of a packet switched voice channel in accordance with an embodiment of the present invention.

DETAILED DESCRIPTION

Figure 1:
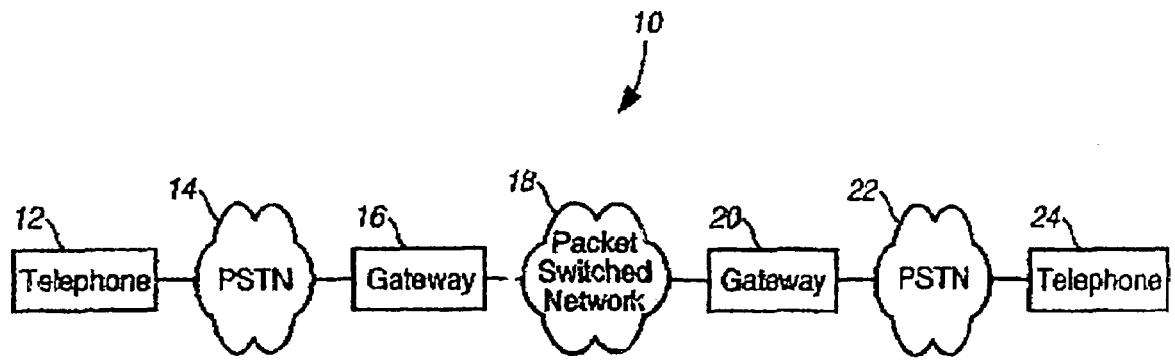
FIG. 1 is a diagram of a hybrid telecommunications network in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An embodiment of the network of the present invention is shown in FIG. 1, and is designated generally throughout by reference numeral 10.

The present invention is directed to a method for monitoring perceived quality of a packet-switched voice service in a network. The method includes the step of receiving a packetized voice communication via the packet-switched voice service. At least one objective measurement is obtained from the received packetized voice communication. User perceived quality of voice data is derived from the at least one objective measurement. The user perceived quality of voice data is provided to a user. The steps of receiving, obtaining, deriving, and providing are performed in real-time. Thus, the present invention provides a system and method for detecting when packet-switched voice services are likely to be perceived by users to be noticeably inferior to familiar PSTN services.

In an approach developed by one of the present inventors, a Voice Quality Evaluation System (VQES) has been used to evaluate the quality of network services. The VQES is a theoretical model used to estimate indicators of likely user perception of quality of voice carried over a telephone connection, from measurements describing the quality of the voice connection. The inputs to the VQES are measurements of, or nominal values for, seven measures of a telephone connection: received speech signal power, or test signal power attenuation; C-message noise; echo path loss and echo path delay; characteristics of natural speech waveforms; dropped packet rates; and round trip signal transport delays. All of these objective characteristics are measured in a way that serves as a reliable indicator of when users will complain of distortion, low volume, echo, noise, or a noticeable delay in the flow of conversation. The resultant data sets are transformed into measures that can be readily compared to determine whether users are likely to perceive a difference in voice quality among competing services tested. Measures of this kind produced by the VQES include, for example, estimates of MOS and P[UDI]. The MOS is a Mean Opinion Score (MOS) that is derived from subjective user evaluation of voice quality under the conditions reflected in the distribution of the objective measurements described above. P[UDI] refers to the proportion of calls in the sample for which the subjective user evaluation of the effects of the impairments would be that they rendered the call "unusable", "difficult", or "irritating." As embodied herein, and depicted in FIG. 1, an example of a hybrid telecommunications network in accordance with the present invention is disclosed. Hybrid telecommunications network 10 includes public switched telephone network (PSTN) 14 coupled to packet switched network 18 by way of gateway 16. PSTN 22 is also coupled to packet switched network 18 by way of gateway 22. In the example shown in FIG. 1, standard POTS telephone 12 initiates a call with standard POTS telephone 24 by way of circuit switched PSTN 14. PSTN 14 routes the call to gateway 16. Gateway 16 converts time division multiplexed (TDM) signals into packets that are compatible with packet switched network 18. Gateway 16 has access to a directory of IP addresses of exit gateways. Gateway 16 uses the directory to select gateway 20. Packet switched network 18 transports the packets to gateway 20. Gateway 20 converts the packets back into a TDM format compatible with PSTN 22. PSTN 22 routes the TDM signal to telephone 24.

Packet switched network 18 is commonly referred to as a converged network. A converged network is adapted to carry various types of media, such as voice, data, and audio or video streams. Each of these media types are digitized and formatted into discrete packets of data. Packet switched network 18 may be of any suitable type, but there is shown by way of example an Internet Protocol (IP) network adapted to carry packet-switched voice, or Voice-over-IP (VoIP). In one embodiment, network 18 is the public Internet. The Internet is the term used to describe the worldwide collection of interconnected networks that are linked together by the use of the Internet Protocol (IP). This worldwide collection of networks includes a host of networks sponsored by academic, commercial, governmental, and military entities. In another embodiment, packet switched network 18 may include a packet switched network, or a collection of packet switched networks interconnected by a common protocol, not connected to the Internet. An example of such a network would be a privately owned intranet, or enterprise network. In yet another embodiment, network 18 may include any or all of enterprise networks, intranets, and the public Internet.

Figure 2:
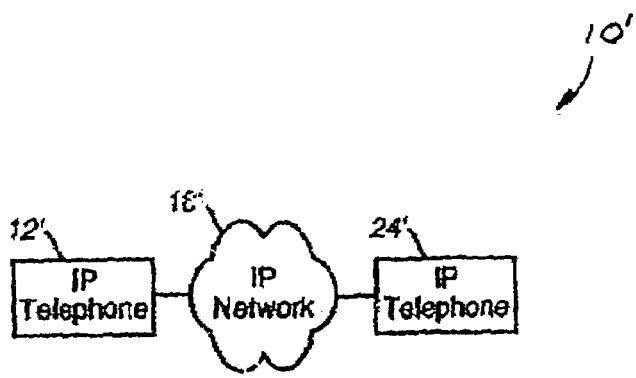
FIG. 2 is a diagram of an IP telecommunications network in accordance with the present invention.

As embodied herein, and depicted in FIG. 2, another example of a telecommunications network in accordance with the present invention is disclosed. In this example, network 10' is an end-to-end packet switched network. IP telephone 12' generates packet switched voice signals that are provided directly to packet switched network 18'. The packets are routed to IP telephone 24' by network 18'. Those of ordinary skill in the art will recognize that IP telephone 12' and IP telephone 24' may include a standard telephone that is coupled to packet interfacing equipment.

Further details on hybrid and end-to-end packet-switched networks are provided in commonly assigned patent application Ser. No. 08/751,023 filed Nov. 18, 1996 and Ser. No. 08/798,350 filed Feb. 10, 1997, each of which is incorporated herein by reference.

The present invention provides a real-time, or a near real-time, monitoring system for packet-switched telephone networks. The system works equally well with the hybrid network shown in FIG. 1 or the end-to-end packet-switched telephony system shown in FIG. 2. Those of ordinary skill in the art will recognize that both FIG. 1 and FIG. 2 are simplifications of what a "real world" network would comprise. Much equipment is not illustrated for the sake of simplicity and ease of illustration. For example, the routing within the packet switched networks is performed by numerous routers as well as other components.

Figure 3:
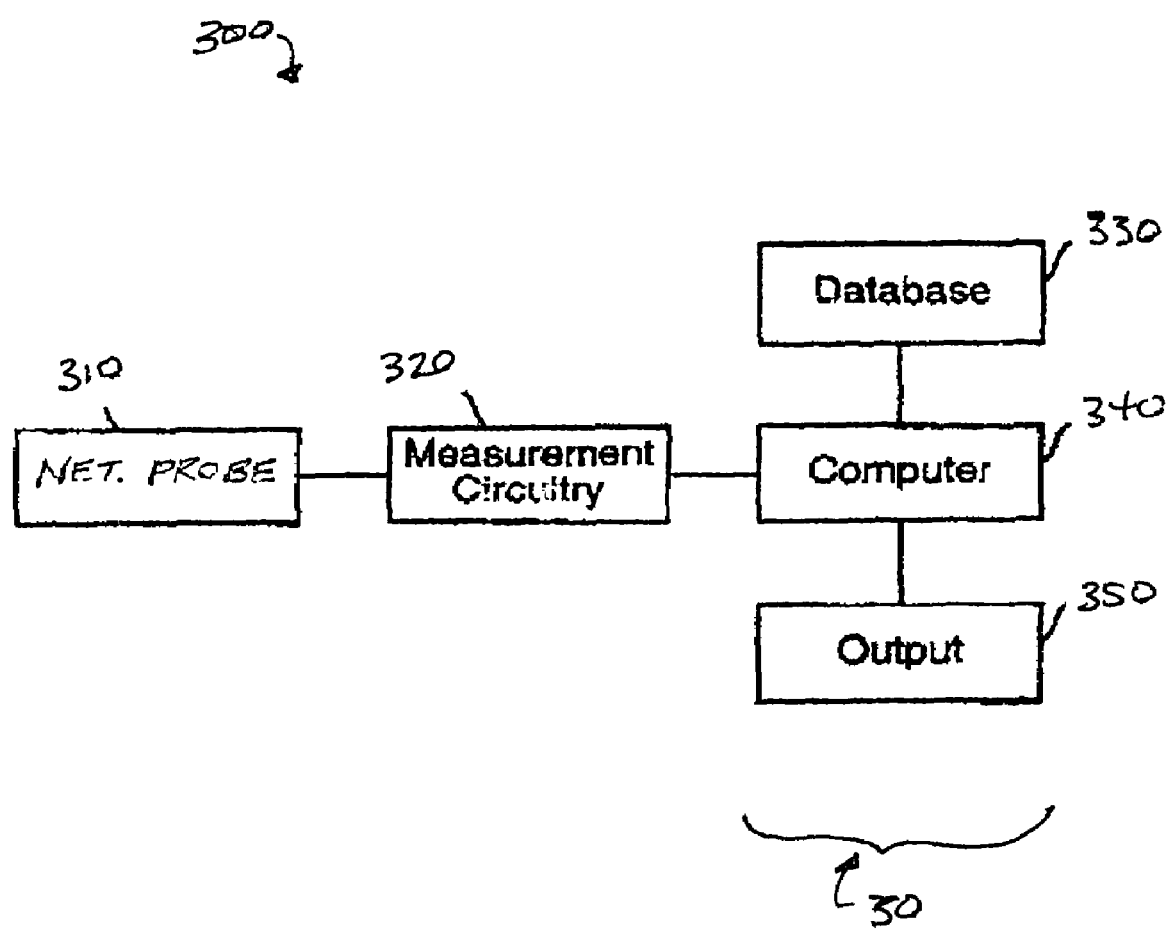
FIG. 3 is a block diagram of a system for evaluating the perceived quality of a packet switched voice channel in accordance with an embodiment of the present invention.

As embodied herein and depicted in FIG. 3, a system 300 for evaluating the quality of a packet switched voice channel is disclosed. Measurement probe 310 is coupled to the packet-switched voice channel (not shown). Probe 310 is coupled to measurement circuitry 320. Measurement circuitry provides computer 340 with test measurements which include objective characteristics of the voice signal.

In one embodiment the objective characteristics are those reflecting or determining the two principal ways that packet-switching can degrade perception of voice quality. These comprise: effects of dropped packets on user perception of speech distortion, and effects of additional round trip delay due to packet latency on natural conversational rhythms. The objective measures used for illustration here are the dropped frame rate and the round-trip packet latency. These are, however, for illustration only, as those with ordinary skills in the art of voice quality measurement will be readily able to identify alternatives that will accomplish the same end without deviating from the present invention.

In another embodiment, probe 310 and measurement circuitry 320 are implemented in selected routers disposed in the network. In another embodiment some of the computing functionality may also be disposed in the selected router. For example, Cisco Systems, Inc. manufactures a series of router devices commonly referred to as the Gigabit Switch Router 12000 Series of routers. These devices are commonly employed in the backbone of the Internet. The 12000 Series uses 200 MHZ R5000 processors. The largest model in the 12000 Series is the 12016 model, which accommodates up to 320 G/bits of data per second and can process up to 60 million data packets per second. In other embodiments, these elements are implemented in gateways or in other network elements. Alternatively, probe 310 and circuitry 320 are implemented in a stand-alone piece of equipment that is not part of the network.

The objective characteristics measured by circuitry 320 include dropped frame rate (DFR) and round trip packet-switched delay (RTL). As described earlier, each of these objective characteristics affect one or more of a plurality of measures describing the quality of the voice signal as perceived by users. Using techniques described below, measurements of the objective characteristics can therefore be translated into quantifications for each of the subjectively assessed quality characteristics.

System 300 also includes a database 330 that stores a reference matrix. The reference matrix provides reference quality information for voice signals. The reference matrix will be described in more detail below. Database 330 is coupled to computer 340. Computer 340 runs software that estimates the likely user perception of quality information for a given input voice signal. Once the quality estimates are calculated, they are utilized by maintenance display 350. The functionality of display 350 is described in more detail below. However, in one embodiment, display 350 is coupled to real-time control circuitry. In another embodiment, display 350 provides service messages to a technician in a network maintenance location. Service messages could also be transmitted via pagers, e-mail, audio display and/or visual display. Those of ordinary skill in the art will recognize that database 330, computer 340, and display 350 may be co-located in a network maintenance facility 30.

Essentially, the present invention operates as follows. A reference matrix that mathematically describes a totality of conditions for which users are likely to find quality of a voice service acceptable is stored in database 330. As will be described in more detail below in conjunction with FIG. 4, the reference matrix is empirically derived from the seven objective voice characteristics mentioned above. After the test measurements are obtained by probe 310 and circuitry 320, computer 340 creates a test matrix using the measurements for a plurality of calls obtained by circuitry 320. The test matrix is processed, in near real time, to determine whether the quality of voice over the packet-switched voice service for the time period of the observations was acceptable. This determination is made by comparing the reference matrix to the test matrix. An alarm is generated if the results of the comparison of the reference and test matrices indicates the possibility of unacceptable quality. The alarm notification is accompanied by a reference pattern matrix providing an indication of the matrix cells for which the comparison was negative. Information indicating the underlying cause and the proper response is displayed for system operators. A description of each of the above mentioned processing routines is provided below.

Figure 4:
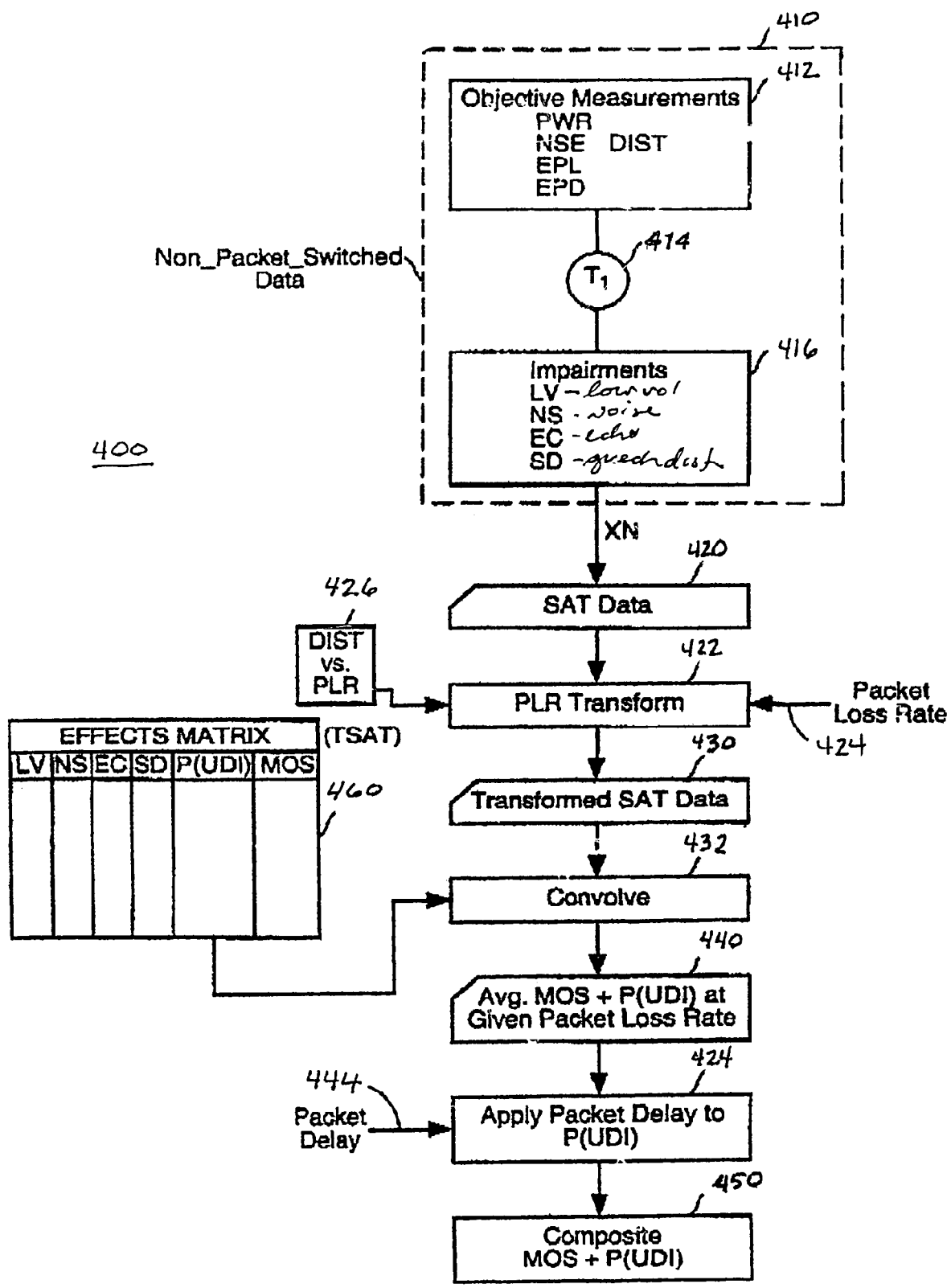
FIG. 4 is a chart showing a process for providing a reference matrix in accordance with the present invention.

Referring to FIG. 4, a process for providing the reference matrix is described. In particular, data flow diagram 400 shows the manner in which data from objective and subjective measurements of a communications service may be processed in accordance with the present invention. Data flow diagram 400 initially employs non-packet switched data 410. Non-packet switched data 410 is derived by transforming objective measurements 412 into perceived impairment data 416 by the application of transform 414. Objective measurements 412 include signal power (PWR), C-weighted noise (NSE), echo path delay (EPD), echo path loss (EPL), and waveform distortion (DST). Impairments 416 are analogous to subjective ratings of perceived impairments, namely low volume (LV), noise (NS), echo (EC), and speech distortion (SD). Note that various combinations of objective measurements 412 will affect different ones of the subjectively rated impairments 416. Empirical experiments under varying conditions of signal power, noise level, and et cetera enable a transform 414 to be constructed which accurately predicts impairments 416 that will reported in response to a given combination of objective measurements 412. A manner in which transform 414 may be established by empirical experiments is described in U.S. patent application Ser. No. 09/778, 186, which is a continuation-in-part of U.S. Pat. No. 6,370, 120. Both U.S. Pat. No. 6,370,120 and U.S. patent application Ser. No. 09/778,186 are incorporated herein, by reference, in their entireties.

Transform 414 maps objective measurements 412 to impairments 416 regardless of the actual mechanism of signal transport chosen. Any communications service exhibiting a particular combination of signal and noise levels and other characteristics will be similarly rated by listeners regardless of whether the signal is actually traversing radio signals, PCM codecs, long-haul TDM equipment, or a packet-switched data network.

Where the quality of a particular communications service is to be measured, many sets of objective measurements 412 may be recorded. Each such set of measurements is then converted using transform 414 into a set of impairments 416. A set of impairments 416 may comprise the four impairments LV, NS, EC, and SD each rated by test subjects as being "none", "some" or "much". It is also possible to directly collect subjective measurements of impairments 416 from a communications service by conducting test calls, although this practice is tedious and disadvantageous where transform 414 is already well established. As described above, measurement set 410 includes objective measurements 412 transformed into a set of impairments 416. In another embodiment, measurement set 410 includes a set of subjectively rated impairments 416 directly obtained from test calls through a communications service. A large number of measurement sets 410 pertaining to given communication service may be said to comprise the service attribute test (SAT) data 420 for the service. As described in U.S. Pat. No. 6,370,120, the SAT data 420 for a given communication service may be convolved with an effects matrix 460 to yield an estimate of mean opinion score and P(UDI) for the service. Like transform 414, effects matrix 460 is a prediction model that may be constructed from large numbers of empirical observations to correlate reported impairments to overall MOS and P(UDI) values.

The relationships captured in the process displayed in FIG. 4 enable analyses, conducted in the manner taught in U.S. Pat. No. 6,370,120, to determine combinations of dropped frame rate (DFR) and round-trip packet-switched delay (RTL) that represent acceptable quality, relative to extant circuit switched telephony (e.g., wherein no packet-switching takes place). This is accomplished as follows:

A packet loss rate (PLR) transformation 422 is applied based upon a presumed packet loss rate 424. This transformation 422 redistributes, within SAT data 420, the proportions of reporting various combinations of impairments resulting, in this case, in the estimate of the speech distortion impairment, augmented in relation to how much packet loss is occurring. Transformation 422 draws upon a table 426 relating reports of speech distortion versus packet loss rate when all other impairments are negligible. The result of transformation 422 is transformed SAT data 430. SAT data 430 reflects the performance of a communication service suffering a level of packet loss rate in conjunction with whatever other impairments were present in SAT data 420 prior to PLR transformation 422.

Transformed SAT data 430 is then convolved with effects matrix 460 in process block 432. The result is an estimated set of MOS and P(UDI) values 440. These values take into account the rate of packet loss 424 provided as input earlier.

In step 444, the effects of packet delay are applied to the P(UDI). The effects of packet delay upon P(UDI) are calculated and applied to the P(UDI). It may be generally said that the greater the packet delay, the more P(UDI) is increased. It has been determined experimentally by the present inventors that packet delay affects P(UDI) independently of other impairments. Therefore, it suffices to apply the effects of packet delay after all other impairments are accounted for and to do so without repeating the development of transform 414 or effects matrix 460. After packet delay is taken into account in block 442, the result is the composite MOS and P(UDI) for the communication service with both a given packet delay and packet loss rate represented. The composite MOS and P[UDI] are then compared with limits corresponding to acceptable circuit switched telephony values, to produce a profile like that shown in FIG. 5. FIG. 5, of course, shows acceptable cumulative distribution functions (CDFs) for DFRs associated with the PLRs as a function of the RTL. This matrix is the reference matrix of the current invention.

As embodied herein and depicted in FIG. 5, a matrix 500 illustrating the semantic content of the test matrix, the reference matrix and a reference pattern matrix is disclosed. Each of these are described in more detail below. As shown, the rows 502 are defined by variable round-trip latency intervals, in milliseconds. Columns 504 are defined in terms of variable dropped frame rate intervals, e.g., the average number of frames dropped per second. Thus, the boundaries defining row 502 and column 504 content can be readily changed. The intervals represent lower and upper values for a range of possible values that are used to produce counts of test data elements (in the test matrix) satisfying different conditions defined by round-trip latency (RTL) and dropped frame rates (DFR) for each recorded test.

A description of the test matrix is as follows. The test matrix is constructed by measuring a multiplicity of connections between a first location and a second location. The matrix is populated with a count of observed calls. For example, a five (5) in element 506 indicates that five calls were observed having an RTL in the interval between 281-307 msec, and a DFR less that 1.5.

The amount of data to be accumulated in populating the test matrices is user specified. This is implemented via one of three control options. In one embodiment, the number of data points to be accumulated in the test data matrix is specified before recording the test measurements. Alternatively, the number of scheduled probe tests to be accumulated in the test data matrix may be specified before recording. In the third alternative, the time period over which all available test results are to be accumulated is specified before the test data matrix is recorded. As they are created, the test results accumulated in any test data matrix must comprise only those tests run for one particular origin/destination pair (order considered). Data records comprising the content of a test result matrix shall be annotated to show: the probe from which the tests whose results are recorded in the test data matrix originated; the destination probe; the date and time of the start of the first test whose results are accumulated in the test data matrix; and the time of the end of the last test whose results are accumulated in the test data matrix.

As described above, the test data matrix is processed, in near real time, to determine the quality of voice over the packet-switched voice service. Interpretation of test data matrices to detect indications of unacceptable voice quality are accomplished in the following way. When the routine for processing the test data matrix, $M_{ij}$, is invoked, each row is summed step by step, to produce a cumulative matrix $S_{ij}$. $S_{ij}$ is the sum of the $M_{ik}$ values from k=1 to k=j. For example, the third element in a particular row of cumulative matrix $S_{ij}$ is the sum of the first, second, and third elements in the corresponding row of test data matrix $M_{ij}$. Likewise, the fourth element in a row of cumulative matrix $S_{ij}$ is the sum of the first, second, third, and fourth elements in the corresponding row of test data matrix $M_{ij}$. This process is performed for each element in a row-by-row manner.

Each of the entries in each row of $S_{ij}$ is divided by $S_{in}$, which is the last value in row $S_i$, to produce a cumulative distribution function (CDF) matrix $P_{ij}$. However, if the value of the last value ($S_{in}$) is zero, all the elements of the corresponding row in $P_{ij}$ are populated with zeroes. Otherwise, each row in $P_{ij}$ will comprise a monotone non-decreasing sequence of values ending with the value 1.0.

As described above, the quality of service is determined by comparing the reference matrix to the test matrix. This step is performed indirectly. In actuality, CDF matrix $P_{ij}$ is compared element-by-element to the like-sized reference matrix $R_{ij}$, which was described in detail above. This comparison produces a reference pattern matrix, $R_{ij}$, whose entries are defined by the following criteria:

$R_{ij}$=0 for all values of j in a row i, for which the values $P_{ij}$, are all zero. In other words, when the values of $P_{ij}$ are zero, this indicates that no data was recorded, and the corresponding element of $RP_{ij}$ is set to equal zero.

When $P_{ij}$,≠0, then $RP_{ij}$=1 if $P_{ij}$<($R_{ij}$−Δ), and $RP_{ij}$ =0 if $P_{ij}$≧($R_{ij}$,−Δ).

The variable "Δ" is used to reduce statistically insignificant false alarms produced by application of the routines that are described below. Delta "Δ" may be refined on the basis of experience. The value of Delta (Δ) is a user-specified variable or calculated function of the number of test calls represented in the test matrix. Its purpose is to set a threshold of significance of cell-by-cell differences as might, for example, be derived by application of the Kolmogorov/Smirnov for tests of significance of differences between CDFs.

The step of processing also includes the use of routines that are invoked to produce associated estimates of MOS and P[UDI] from a test data matrix. These routines are implemented by use of two auxiliary items. A MOS vector, VM; and a P[UDI] matrix, MP. For a given test data matrix, M, these items shall be used to calculate estimates of MOS and P[UDI] as follows. To determine MOS, the columns of M are added to produce the vector SC. Element-by-element multiplication of SC by VM is performed to produce the vector VS. To determine P[UDI], element-by-element multiplication of M by MP is performed to produce the matrix SP.

$$MOS=(\Sigma VS)/(\Sigma SC) \quad (1),$$

wherein Σ denotes sum of all of the elements of an array; and $$P[UDI]=(\Sigma SP)/(\Sigma M) \quad (2).$$

The above combination provides valuable information because, for example, where a MOS of 3.6 is very good and might normally be considered to guarantee user satisfaction, studies have shown that users will nonetheless complain of poor quality when the P(UDI) is greater than six percent regardless of the MOS. Therefore, predictions of overall service acceptability are best made considering both MOS and P(UDI).

Referring back to FIG. 3, and in particular, to display 350, the present invention also includes software routines that are configured to automatically display a notice to maintenance personnel of the detection of a newly-generated reference pattern (RP) matrix containing at least one non-zero value. Such a notice shall take the form of a brief alarm message delivered to, or generated by, a host server disposed in the network maintenance facility, and written to a file of alarms. The reference pattern matrix contains enough data to enable data record parsing, to create a human readable amplifying display message. The alarm message is accompanied by a display of the reference pattern matrix and/or natural language descriptors of the conditions that can be inferred from the reference pattern matrix. The human readable message also includes a description of the origin/destination pair associated with the underlying test matrix, and the date and time of the creation of the test data matrix that generated the reference pattern matrix. Receipt of the brief alarm message shall generate a visible notice of this information on display 350.

Maintenance facility 30 and display 350 shown in FIG. 3 include a graphical user interface (GUI). The GUI is equipped with routines that respond to a user selection of the alarm message described above. In one embodiment, the graphical user interface (GUI) is equipped to show a human readable description of the alarm detailing the associated origin/destination pair, and date and time of creation of the underlying test data matrix. A two dimensional display of the CDF matrix $P_{ij}$ may also be displayed in a format like that shown in FIG. 4. The matrix cells whose RP matrix values were non-zero, are highlighted, displayed with a contrasting color, or otherwise visually distinguished. A line of information that displays the associated values of MOS and P[UDI] generated by invoking the routines described above may also be displayed by the GUI.

Referring to database 330 in FIG. 3, the present invention also defines a compact data structure for collecting and archiving annotated test data matrices. Computer 340, or some other maintenance facility host, is configured to retrieve from database archives any test data matrices satisfying user-specified criteria for origin(s) of the test data, destination(s) of the test data, or date and/or time of collection. The data structure for each test matrix may include origination, destination, time/date of matrix creation, and a compact representation of the matrix itself. In one embodiment, the compact representation includes the position points of non-zero values in the matrix, and the values themselves.

Computer 340 is also configured to parse data retrieved from the archived annotated test data matrices stored in database 330. Computer 340 is also programmed to combine individual test data matrices to aggregate results. The aggregated results may be used by network analysts to detect service trends.

As embodied herein, and depicted in FIG. 6, a block diagram of system 600 for evaluating the perceived quality of a packet switched voice channel in accordance with another embodiment of the present invention is disclosed. System 600 is configured to monitor the perceived quality of a call between customer transceiver 200 and customer transceiver 220 over packet transport network 18. Since transceiver 220 is identical to transceiver 200, only transceiver 200 will be discussed in detail. A network management system (NMS) 300 is coupled to packet switched network 18. Since we are mostly concerned with the receive side of transceiver 200, the discussion will center on that aspect of transceiver 200. Transceiver 200 (and 220) includes packet interface 202 which is coupled to packet transport network 18. Packet interface 202 processes the packet headers and provides codec 204 with a coded digital signal. Codec 204 decodes and de-compresses the coded signal and provides D/A converter 206 with a PCM digital signal. D/A converter 206 converts the digital signal into an analog electrical signal. The analog electrical signal is converted into audible sound signal by a transducer, such as audio speaker 208.

In this embodiment, quality analyzer 610 may be coupled to packet interface 202 and/or the output of codec 204. Quality analyzer 610 is configured to analyze both the 64 kbps digital signal coming from the codec, and/or packet transmission statistical data derived from packet interface 202. Each source may be employed to monitor the perceived quality of the packet voice transmission.

Those of ordinary skill in the art will recognize that quality analyzer 610 may be implemented in any number of ways. In one embodiment, quality analyzer 610 may be implemented in software resident in codec 204. The software may be executed by the processor in codec 204. In another embodiment, quality analyzer 610 is implemented as stand alone device similar to the one depicted in FIG. 3.

In one embodiment, quality analyzer 610 is configured to analyze the digital output of the codec to obtain an instantaneous distortion measurement. The distortion measurement is reported to transceiver 220 via the far-end quality indicator 226 (FIG. 6). In this embodiment, the distortion measurement need not be converted into a MOS or a P[UDI] to be reported. The distortion may be reported as a raw measurement, as a normalized score, such as a MOS or something similar thereto, or as a kurtosis value. Reference is made to U.S. Pat. No. 6,246,978, which is incorporated herein by reference as though fully set forth in its entirety, for a more detailed explanation of obtaining distortion measurements directly from a digitized speech signal. In accordance with the teachings of the '978 patent, difference values may be calculated among successive samples in a digitized speech signal and the distribution of these signals may be analyzed. Abnormalities, such as kurtosis, in the distribution of first and/or second differences (which approximate first and second derivatives) may be correlated to perceived distortion.

Because distortion is such an important effect, in some instances it is an effect worth reporting by itself. As explained earlier, it is considered to be advantageous to obtain measurements from the output of the codec so that the actual impact of transmission performance upon codec function may be taken into account. This approach is also advantageous because the arrangement of elements in FIG. 6 and the function of quality analyzer 610 need not change as new codecs are developed and deployed in the future.

In another embodiment, quality analyzer 610 may be more sophisticated, having the same functionality provided by the system depicted in FIG. 3. For example, quality analyzer 610 may be configured to obtain a set of measurements from the digital signal, and estimate the perceived level of impairment using the set of measurements. The set of impairments include low volume, noise, speech distortion, and echo. Analyzer 610 may be configured transform the impairment estimates into a Mean Opinion Score (MOS), and a probability that the calls would be considered as "unusable," "difficult," or "irritating" P[UDI].

As shown in FIG. 6, analyzer 610 may also obtain packet transmission characteristics from packet interface 202. Packet transmission characteristics include packet delay, packet loss, and packet jitter. Packet transmission characteristics may be correlated with the MOS, P[UDI], and/or the perceived impairments to determine if a perceived quality problem is the result of a problem in packet transport network 18, or in a non-packet switched portion of network 10.

Measurements of quality obtained by analyzer 610 or quality indicators derived by analyzer 610 may be communicated to network management system 300 or to a far end transceiver 220 in the form of packetized data through network 18. Analyzer 610 may provide this data to packet interface 202 to be dispatched through network 18. Far-end quality indicator 226 may receive this data and provide a display, such as a bar graph, meter or numerical value to the far end user so that they know immediately how well they are being received. A far end user who observes a significant degradation while they are speaking may know to repeat certain portions of what they have said. Both participants may get a sense of the quality of the connection without having to ask one another if they are being received clearly.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method, performed by one or more devices, for monitoring perceived quality of a packet-switched voice service in a network, comprising:
    receiving a plurality of packetized voice communications via the packet-switched voice service;
    obtaining at least one objective measurement from each of the received packetized voice communications;
    creating a test matrix from the objective measurements;
    providing an N dimensional reference matrix that mathematically models likely user perception of acceptable quality of voice service, the reference matrix being derived from a plurality of objective voice measurements known to affect user perception of voice quality, where N is greater than or equal to two;
    processing the test matrix to determine the quality of voice data over the packet-switched voice service, the quality of voice data over the packet-switched voice service being determined by comparing the reference matrix to the test matrix; and
    outputting information regarding the quality of voice data over the packet-switched voice service,
    where the receiving, obtaining, processing, and outputting are performed in substantially real-time.

2. The method of claim 1, further comprising:
    generating at least one alarm in response to processing the test matrix, the alarm being generated if the quality of voice over the packet-switched voice service is below a predetermined level.

3. The method of claim 2, further comprising displaying the at least one alarm in near real time.

4. The method of claim 3, where displaying the at least one alarm in near real time further comprises:
    displaying a human readable description of the at least one alarm;
    displaying a cumulative distribution function (CDF) matrix, the CDF matrix being derived from the test data matrix; and
    displaying at least one indicator of likely user perception of the quality of voice carried over the packet-switched voice service.

5. The method of claim 4, where the human readable description includes an origin/destination pair associated with the test data matrix, and a date and time associated with the creation of the test data matrix.

6. The method of claim 1, where providing the N dimensional reference matrix further comprises:
    measuring the plurality of objective voice characteristics over a packet-switched voice service to obtain sample measurements;
    post-processing the sample measurements to produce stable estimates of perceived voice quality; and
    creating the reference matrix from the post-processed performance data.

7. The method of claim 1, where processing the test matrix to determine the quality of voice data over the packet-switched voice service further comprises:
    creating a reference pattern matrix, the reference pattern matrix embodying a comparison of the test data matrix and the reference matrix.

8. The method of claim 7, where processing the test matrix to determine the quality of voice data over the packet-switched voice service further comprises:
    creating a cumulative matrix, the cumulative matrix being created by summing each row in the test matrix, step-by-step, such that each element in the row is a sum of all preceding elements.

9. The method of claim 8, where processing the test matrix to determine the quality of voice data over the packet-switched voice service further comprises:
    deriving a cumulative distribution function (CDF) matrix based on the cumulative matrix, the CDF matrix being created by dividing each element in each row of the cumulative matrix by a largest value in each row of the cumulative matrix.

10. The method of claim 9, where processing the test matrix to determine the quality of voice data over the packet-switched voice service further comprises:
    comparing each element of the CDF matrix with each corresponding element of the reference matrix to create the reference pattern matrix.

11. The method of claim 10, where an element of the reference pattern matrix is populated with a zero value when either a corresponding value of the CDF matrix is zero, or if the corresponding value of the CDF matrix is greater than a predetermined value.

12. The method of claim 10, where an element of the reference pattern matrix is populated with a value of one (1) if the corresponding value of the CDF matrix is less than a predetermined value.

13. The method of claim 1, where processing the test matrix to determine the quality of voice data over the packet-switched voice service further comprises:
    computing a mean opinion score (MOS) corresponding to a subjective user evaluation of the quality of voice over the packet-switched voice service.

14. The method of claim 13, where processing the test matrix to determine the quality of voice data over the packet-switched voice service further comprises:
    computing a percentage of calls users would find unusable, difficult, or irritating P(UDI), the P(UDI) corresponding to a subjective user evaluation of the quality of voice over the packet-switched voice service.

15. The method of claim 1, further comprising:
    storing the test data matrix and associated data created during the processing.

16. The method of claim 1, further comprising:
defining a data structure for collecting and archiving annotated test data matrices.

17. The method of claim 16, where the data structure includes an identification of the packet-switched voice service associated with a test data matrix, data corresponding to the test data matrix, and a time and a date the test data matrix was created.

18. The method of claim 1, where the objective measurements include measurements of a plurality of objective voice characteristics.

19. The method of claim 18, where the plurality of test measurements include measurements of a dropped packet rate (DPR) and round trip packet latency (RTL).

20. The method of claim 1, where obtaining the at least one objective measurement from each of the received packetized voice communications, further comprises:
obtaining at least one objective measurement of a reconstituted digital representation of the received packetized voice communication, the reconstituted digital representation being obtained from a receiver codec.

21. The method of claim 20, where the at least one objective measurement includes determining differences among successive samples in the reconstituted digital representation.

22. The method of claim 1, where outputting the information regarding the quality of voice data over the packet-switched voice service comprises:
transmitting the information regarding the quality of voice data over the packet-switched voice service to a quality indicator disposed in a user transceiver set.

23. The method of claim 1, where outputting the information regarding the quality of voice data over the packet-switched voice service comprises:
transmitting the information regarding the quality of voice data over the packet-switched voice service to a network management system.

24. The method of claim 1, where outputting the information regarding the quality of voice data over the packet-switched voice service comprises:
providing a raw distortion measurement.

25. The method of claim 1, where outputting the information regarding the quality of voice data over the packet-switched voice service comprises:
providing a normalized score corresponding to a distortion measurement.

26. The method of claim 21, where outputting the information regarding the quality of voice data over the packet-switched voice service comprises:
determining a kurtosis value of a distribution of the differences.

27. A system for monitoring a quality of a packet-switched voice service in a network, comprising:
a memory element configured to store an N dimensional reference matrix that mathematically models likely user perception of acceptable quality of voice service, the reference matrix being derived from a plurality of objective voice measurements known to affect user perception of voice quality, where N is greater than or equal to two;
a measurement probe configured to obtain a plurality of test measurements for each call placed over the packet-switched voice service; and
a computer coupled to the memory element and the measurement probe, the computer being configured to:
derive a test matrix from the plurality of test measurements,
process the test matrix, in near real time, to determine the quality of voice over the packet-switched voice service, the quality of voice over the packet-switched voice service being determined by comparing the reference matrix to the test matrix, and
output information regarding the quality of the voice over the packet-switched voice service.

28. The system of claim 27, further comprising a network maintenance system coupled to the computer, the network maintenance facility being configured to generate at least one alarm in response to an input received from the computer, the alarm being generated if the quality of voice over the packet-switched voice service is determined to be below a predetermined level.

29. The system of claim 28, where the network maintenance system further comprises at least one display, the at least one display being configured to display the at least one alarm in near real time.

30. The system of claim 28, further comprising a graphical user interface including a display and a selection device, the graphical user interface being configured to:
display a human readable description of the at least one alarm in near real time;
display a cumulative distribution function (CDF) matrix, the CDF matrix being derived from the test data matrix; and
display at least one indicator of likely user perception of the quality of voice carried over the packet-switched voice service.

31. The system of claim 30, where the human readable description includes an origin/destination pair associated with the test data matrix, and a date and time associated with the creation of the test data matrix.

32. The system of claim 27, where the computer is further configured to create a reference pattern matrix, the reference pattern matrix embodying a comparison of the test data matrix and the reference matrix.

33. The system of claim 32, where the computer is further configured to create a cumulative matrix, the cumulative matrix being created by summing each row, step-by-step, such that each element in the row is a sum of all preceding elements.

34. The system of claim 33, where the computer is further configured to derive a cumulative distribution function (CDF) matrix from the cumulative matrix, the CDF matrix being created by dividing each element in each row of the cumulative matrix by a largest value in each row of the cumulative matrix.

35. The system of claim 34, where the computer is further configured to compare each element of the CDF matrix with each corresponding element of the reference matrix to create a reference pattern matrix.

36. The system of claim 35, where an element of the reference pattern matrix is populated with a zero value when either a corresponding value of the CDF matrix is zero, or if the corresponding value of the CDF matrix is greater than a predetermined value.

37. The system of claim 35, where an element of the reference pattern matrix is populated with a value of one (1) if the corresponding value of the CDF matrix is less than a predetermined value.

38. The system of claim 27, where the computer is further configured to compute a mean opinion score (MOS) corresponding to a subjective user evaluation of the quality of voice over the packet-switched voice service.

39. The system of claim 27, where the computer is further configured to compute a percentage of calls users would find unusable, difficult, or irritating P(UDI), the P(UDI) corresponding to a subjective user evaluation of the quality of voice over the packet-switched voice service.

40. The system of claim 27, where the computer is further configured to store the test data matrix and associated data created when the computer processes the test matrix.

41. The system of claim 27, where the computer is further configured to collect and archive annotated test data matrices in a data structure.

42. The system of claim 41, where the data structure includes an identification of the packet-switched voice service associated with a test data matrix, data corresponding to the test data matrix, and a time and a date the test data matrix was created.

43. The system of claim 27, further comprising a data base configured to store reference matrices, test measurements, and/or test matrices.

44. The system of claim 28, where the network maintenance facility is further configured to:
   display a message in response to generating the alarm;
   receive a selection of an amplifying display icon by a selection device;
   display a human readable description of the alarm in response to selection; and
   display at least one indicator of likely user perception of the quality of voice carried over the packet-switched voice service.

45. The system of claim 44, where the at least one indicator includes a mean opinion score (MOS).

46. The system of claim 44, where the at least one indicator includes a percentage of calls users would find unusable, difficult, or irritating P(UDI), the P(UDI) corresponding to a subjective user evaluation of the quality of voice over the packet-switched voice service.

47. The system of claim 44, where the at least one indicator includes a distortion indicator.

48. A method, performed by one or more devices, for monitoring perceived quality of a packet-switched voice service in a network, the method comprising:
   providing an N dimensional reference matrix that mathematically models likely user perception of acceptable quality of voice service, the reference matrix being derived from a plurality of objective voice measurements known to affect user perception of voice quality, where N is greater than or equal to two;
   obtaining a plurality of test measurements for each call placed over the packet-switched voice service;
   creating a test matrix from the plurality of test measurements;
   processing the test matrix, in near real time, to determine the quality of voice data over the packet-switched voice service, the quality of voice data over the packet-switched voice service being determined by comparing the reference matrix to the test matrix, and
   outputting information associated with the quality of voice data over the packet-switched voice service.

* * * * *